(12) United States Patent
Abusleme et al.

(10) Patent No.: US 6,482,882 B2
(45) Date of Patent: *Nov. 19, 2002

(54) (CO)POLYMERIZATION PROCESS OF FLUORO-CONTAINING MONOMERS FOR OBTAINING HYDROGEN CONTAINING POLYMERS

(75) Inventors: Julio A. Abusleme, Saronno (IT); Alba Chittofrati, Milan (IT)

(73) Assignee: Ausimont S.P.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/577,504

(22) Filed: May 24, 2000

(65) Prior Publication Data

US 2002/0035178 A1 Mar. 21, 2002

Related U.S. Application Data

(62) Division of application No. 08/740,406, filed on Oct. 29, 1996, now Pat. No. 6,103,843.

(30) Foreign Application Priority Data

Oct. 31, 1995 (IT) .......................... MI95A2264

(51) Int. Cl.$^7$ .......................... C08L 71/00; C08F 14/18; C08F 2/24
(52) U.S. Cl. .......................... 524/463; 524/380; 524/392; 524/462; 526/206; 526/227; 526/230.5; 526/232.1; 526/242; 526/911
(58) Field of Search ................. 524/463, 462; 526/227, 230.5, 232.1, 242

(56) References Cited

U.S. PATENT DOCUMENTS

| | | |
|---|---|---|
| 3,242,218 A | 3/1966 | Miller |
| 3,467,635 A | 9/1969 | Brasen |
| 3,535,926 A | 10/1970 | Hrdina |
| 3,624,250 A | 11/1971 | Carlson |
| 4,243,770 A | 1/1981 | Tatemoto et al. |
| 4,451,646 A | 5/1984 | Sianesi et al. |
| 4,513,129 A | 4/1985 | Nakagawa et al. |
| 4,524,194 A | 6/1985 | Dumoulin |
| 4,694,045 A | 9/1987 | Moore |
| 4,739,024 A | 4/1988 | Moggi et al. |
| 4,789,917 A | 12/1988 | Miller |
| 4,864,006 A | 9/1989 | Giannetti et al. |
| 4,973,633 A | 11/1990 | Moore |
| 5,087,699 A | 2/1992 | Inukai et al. |
| 5,091,589 A | 2/1992 | Meyer et al. |
| 5,428,122 A | 6/1995 | Abusleme et al. |
| 5,498,680 A * | 3/1996 | Abusleme .................... 526/209 |

FOREIGN PATENT DOCUMENTS

| | | |
|---|---|---|
| EP | 0148482 | 7/1985 |
| EP | 0154297 | 9/1985 |
| EP | 0244839 | 11/1987 |
| EP | 0340739 | 11/1989 |
| EP | 0340740 | 11/1989 |
| EP | 0407937 | 1/1991 |
| EP | 0445738 | 9/1991 |
| EP | 0518073 | 12/1992 |
| EP | 0337346 | 12/1993 |
| EP | 0 612 767 * | 8/1994 |
| EP | 0625526 | 11/1994 |
| EP | 0625626 | 11/1994 |
| EP | 0626395 | 11/1994 |
| EP | 0673952 | 9/1995 |
| GB | 0888765 | 2/1962 |
| GB | 1104482 | 2/1968 |

* cited by examiner

*Primary Examiner*—Fred Zitomer
(74) *Attorney, Agent, or Firm*—Arent Fox Kintner Plotkin & Kahn

(57) ABSTRACT

Polymerization process of unsaturated pefluoromonomers, fluoro-containing monomers and optionally in the presence of hydrogen containing olefins, for obtaining polymers contaning hydrogen and fluorine, which utilizes a microemulsion comprising the following components:

(a) water;
(b) a fluoropolyoxyalkylene having hydrogen-containing end groups and/or hydrogen-containing repeating units;
(c) a fluorine-free organic radicalic initiator for the polymerization of fluoro-containing monomers, soluble in component (B);
(d) a fluoro-containing surfactant.

8 Claims, No Drawings

(CO)POLYMERIZATION PROCESS OF FLUORO-CONTAINING MONOMERS FOR OBTAINING HYDROGEN CONTAINING POLYMERS

This application is a Divisional application of U.S. Ser. No. 08/740,406, filed Oct. 29, 1996, U.S. Pat. No. 6,103,843.

The present invention relates to (co)polymerization processes of monomers for obtaining polymers containing hydrogen and fluorine.

In particular it relates to (co)polymerization processes having improved reaction rate, i.e., higher polymerization yield.

(Co)polymerization processes of unsaturated perfluoromonomers, optionally fluoro-containing monomers, and optionally in the presence of hydrogen-containing olefins, by polymerization in aqueous emulsion or in suspension, are known.

It is known that in the (co)polymerization in aqeuous emulsion of fluoro-containing monomers the addition of chlorofluorocarbons (CFC) increases the reaction rate. See for instance U.S. Pat. No. 3,535,926.

To avoid the use of CFC considered harmful to the ozone layer of the atmosphere, (co)polymerization processes are known in the art wherein fluoro-containing monomers are polymerized in the presence of perfluoropolyoxyalkylenes with fluoro-containing end groups utilized under the form of dispersions and/or aqueous emulsions. See for intance U.S. Pat. No. 4,789,917. These processes also allow to obtain an improvement of the reaction rate and a lowering of the working pressure.

(Co)polymerization processes are also known in the art wherein the fluoro-containing monomers are polymerized in the presence of perfluoropolyoxyalkylenes with fluoro-containing end groups utilized under the form of aqueous microemulsion, see for instance U.S. Pat. No. 4,864,006, by which it is possible to further increase the reaction rate.

(Co)polymerization processes of fluoro-containing monomers in aqueous emulsion are also known, wherein an aqueous emulsion of a perfluoropolyoxyalkylene having hydrogen-containing end groups and/or hydrogen-containing repeating units is used.

It has thus been possible to obtain the reduction of the trigger time and a minimization of the formation of low molecular weights compared with the processes employing perfluoropolyoxyalkylenes microemulsions with perfluorinated end groups. The reaction rate substantially results similar to that obtained with the perfluoropolyethers microemulsions with perfluorinated end groups. See European patent application EP-A-625,526.

The Applicant has unexpectedly and surprisingly found that it is possible to further improve the reaction rate in (co)polymerization processes of unsaturated perfluoromonomers, fluoro-containing monomers and optionally in the presence of hydrogen-containing olefins to give polymers containing hydrogen and fluorine, and in the meantime to obtain polymers with good mechanical properties and improved chemical resistance defined hereinafter.

Object of the present invention is therefore a polymerization process of unsaturated perfluoromonomers, fluoro-containing monomers, and optionally in the presence of hydrogen-containing olefins for obtaining polymers containing hydrogen and fluorine, which utilizes a microemulsion comprising the following components:

(a) water;
(b) a fluoropolyoxyalkylene having hydrogen-containing end groups and/or hydrogen-containing repeating units;
(c) a fluorine-free organic radicalic initiator for the polymerization of fluoro-containing monomers, soluble in component (b). The component c) is optionally dissolved in an hydrocarbon $C_1$–$C_{20}$, preferably $C_1$–$C_{14}$, of aliphatic, cycloaliphatic, aromatic or mixed type, optionally the hydrocarbon can contain halogen atoms, i.e. chlorine and bromine; the solution being soluble in component b);
(d) a fluoro-containing surfactant.

The fluoropolyoxyalkylenes having hydrogen-containing end groups and/or hydrogen-containing repeating units of component b), are known products, already described, for instance, in the already cited European patent application No. 625526. They are formed by repeating units, randomly distributed along the chain, selected from:

—CFZO—, —CF$_2$CFZO—,

—CZ$_2$CF$_2$CF$_2$O—,

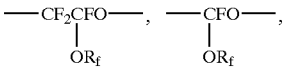

where Z is H or F, $R_f$ is $CF_3$, $C_2F_5$, or $C_3F_7$;

and by hydrogen-containing end groups selected from —CF$_2$H, —CF$_2$CF$_2$H, —CFH—CF$_3$, and —CFH—OR$_f$, wherein $R_f$ is defined as above; or perfluorinated end groups selected from —CF$_3$, —C$_2$F$_5$, and —C$_3$F$_7$, at least one of the end groups containing hydrogen. The perfluorinated end group can also contain a chlorine atom, for instance of the type CF$_2$Cl, CF$_3$—CFCl—CF$_2$,

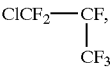

according to EP patents 340,740, 340,739.

The average molecular weight is generally from 200 to 4000, preferably from 400 to 1000. The content in hydrogen is generally higher than 10 ppm, preferably higher than 100 ppm. In practice the low value of hydrogen is obtained by a mixture of perfluoropolyethers (PFPE) containing hydrogen (H) in the end group and/or in hydrogen-containing repeating units, with PFPE not containing H. The H maximum value is obtained when component b) contains only PFPE containing H as defined above. Intermediate values are obtained by modulating the amounts of the two PFPE products containing H and not containing H.

In particular, the fluoropolyoxyalkylenes containing hydrogen can be selected from the following classes:

(a)

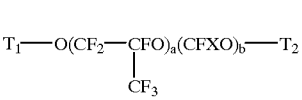

wherein:

$T_1$ and $T_2$, equal to or different from each other, are hydrogen-containing groups —CF$_2$H, —CFH—CF$_3$, or perfluorinated groups —CF$_3$, —C$_2$F$_5$, —C$_3$F$_7$, wherein at least one of the end groups contains hydrogen;

X is —F or —CF$_3$; a, b being integers such that the molecular weight is comprised in the above range, a/b being comprised between 5 and 15;

(b) T$_3$—O(CF$_2$CF$_2$O)$_c$(CF$_2$O)$_d$—T$_4$ wherein:

T$_3$ and T$_4$, equal to or different from each other, are hydrogen-containing groups —CF$_2$H or —CF$_2$—CF$_2$H, or perfluorinated groups —CF$_3$, —C$_2$F$_5$; wherein at least one of the end groups contains hydrogen; c, d being integers such that the molecular weight is comprised in the above range, c/d is comprised between 0.3 and 5;

(c)
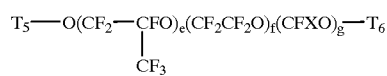

wherein:

T$_5$ and T$_6$, equal to or different from each other, are hydrogen-containing groups —CF$_2$H, —CF$_2$CF$_2$H, or —CFH—CF$_3$, or perfluorinated groups —CF$_3$, —C$_2$F$_5$, —C$_3$F$_7$, wherein at least one of the end groups contains hydrogen; X is —F or —CF$_3$; e, f, g are integers such that the molecular weight is comprised in the above range, e/(f+g) being comprised between 1 and 10, f/g being comprised between 1 and 10;

(d)
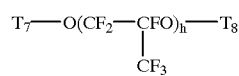

wherein:

T$_7$ and T$_8$ are hydrogen-containing groups —CFH—CF$_3$, or perfluorinated groups —C$_2$F$_5$, —C$_3$F$_7$, at least one of the end groups containing hydrogen; h being an integer such that the molecular weight is comprised in the above range;

(e) T$_9$—O(CZ$_2$CF$_2$CF$_2$O)$_i$—T$_{10}$ wherein:

Z$_2$ is F or H; T$_9$ and T$_{10}$, equal to or different from each other, are groups —CF$_2$H or —CF$_2$—CF$_2$H, or perfluorinated groups —CF$_3$, —C$_2$F$_5$, —C$_3$F$_7$, wherein at least one of the end groups contains hydrogen; i being an integer such that the molecular weight is comprised in the above range;

(f)
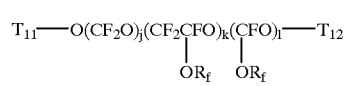

wherein:

R$_f$ is —CF$_3$, —C$_2$F$_5$, or —C$_3$F$_7$; T$_{11}$ and T$_{12}$, equal to or different from each other, are groups —CF$_2$H, —CF$_2$CF$_2$H, —CFH—OR$_f$, or perfluorinated groups —CF$_3$, —C$_2$F$_5$, —C$_3$F$_7$, wherein at least one of the end groups contains hydrogen; j, k, l being integers such that the molecular weight is comprised in the range indicated above, k+l and j+k+l are at least equal to 2, k/(j+l) is comprised between 10$^{-2}$ and 10$^3$, l/j is comprised between 10$^{-2}$ and 10$^2$;

(g)
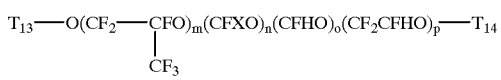

wherein:

T$_{13}$ and T$_{14}$, equal to or different from each other, are hydrogen-containing groups —CF$_2$H, —CFH—CF$_3$, or perfluorinated groups —CF$_3$, —C$_2$F$_5$, —C$_3$F$_7$, wherein at least one of the end groups contains hydrogen;

X is —F or —CF$_3$; m, n, o, p being integers such that the molecular weight is comprised in the range indicated above, m/n is comprised between 5 and 40, m/(o+p) is comprised between 2 and 50, o+p is at least 3, o is lower than p;

(h) T$_{15}$—O(CF$_2$CF$_2$O)$_q$(CF$_2$O)$_r$(CFHO)$_s$(CF$_2$CFHO)$_t$—T$_{16}$ wherein:

T$_{15}$ and T$_{16}$, equal to or different from each other, are hydrogen-containing groups —CF$_2$H, —CF$_2$—CF$_2$H, or perfluorinated groups —CF$_3$, —C$_2$F$_5$, at least one of the end groups containing hydrogen; q, r, s, t are integers such that the molecular weight is comprised in the range indicated above, q/r is comprised between 0.5 and 2, (q+r)/(s+t) is comprised between 3 and 40, s+t is at least 3, s is lower than t;

(i)

wherein:

T$_{17}$ and T$_{18}$, equal or different from each other, are hydrogen-containing groups —CF$_2$H, —CF$_2$CF$_2$H, —CFH—CF$_3$, or perfluorinated groups —CF$_3$, —C$_2$F$_5$, —C$_3$F$_7$, wherein at least one of the end groups contains hydrogen; X is —F or —CF$_3$; u, v, w, x, y are integers such that the molecular weight is comprised in the range indicated above, (u+v)/w is comprised between 5 and 40, (u+v)/(x+y) is comprised between 2 and 50, x+y is at least 3, x is lower than y.

The exemplified compounds from (a) to (i) can contain variable amounts of H, as defined above, by mixing them with (per)fluoropolyethers not containing H and having prfluorinated end groups or containing a chlorine atom as defined above.

They are products obtainable by hydrolysis and subsequent decarboxylation of the —COF groups present in the corresponding perfluoropolyoxyalkylenes. See for instance patents EP-154,297, U.S. Pat. No. 4,451,646 and U.S. Pat. No. 5,091,589.

The starting perfluoropolyoxyalkylenes containing —COF groups as end groups and/or along the chain are described, for instance, in patents GB-1,104,482 (class (a)), U.S. Pat. No. 3,715,378 (class (b)), U.S. Pat. No. 3,242,218 (classe (c)), U.S. Pat. No. 3,242,218 (classe (d)), EP-148,482 (class (e)), EP-445,738 (class (f)), EP-244,839 and EP-337,346 (classes (g), (h), (i)).

Alkylperoxides, for instance, diterbutylperoxide, alkylperoxydicarbonates, for instance diisopropylperoxydicarbonate, di-n-propylperoxydicarbonate, etc., can be mentioned as component C (radical initiator). As possible solvents for peroxide, among hydrocarbons, those branched $C_6–C_{14}$ are preferred, characterized by a ratio between number of methyl groups and number of carbon atoms higher than 0.5, as described in EP patent application EP-A-612,767.

Examples of branched aliphatic hydrocarbons belonging to such class are: 2,3-dimethylbutane, 2,3-dimethylpentane, 2,2,4-trimethylpentane, 2,2,4,6,6-pentamethylheptane, 2,2,4,4,6-pentamethylheptane, or mixtures thereof.

Other usable hydrocarbons in the microemulsions object of the present invention are, for instance: cyclic aliphatic hydrocarbons, such as cyclopentane, methylcyclopentane, cyclohexane, or n-pentane, iso-pentane, chloro-butane, chloroform, benzene, toluene and the like, or mixtures thereof.

The fluoro-containing surfactant (component (d)) can be of both ionic and non-ionic type. It is also possibile to use mixtures of different surfactants. In particular, the fluoro-containing surfactant can be selected from the anionic ones of formula:

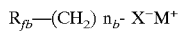

$$R_{fb}\text{—}(CH_2)\ n_b\text{-}\ X^-M^+$$

wherein: $n_b$ is an integer from 0 to 6; $R_{fb}$ is a (per)fluoroalkyl chain $C_5–C_{16}$ or a (per)fluoro-polyoxyalkylene chain as defined above, $X^-$ is —COO$^-$ or —SO$_3^-$, $M^+$ is selected from: $H^+$, $NH_4^+$, alkali metal ion. The $R_{fb}$ chain can contain one or more anionic groups described above; the end group $R_{fb}$ can contain chlorine atoms, see above for instance, EP Patents 340740, EP 340739.

If a non-ionic fluoro-containing surfactant is used, it can be selected for instance from: polyoxyalkylenefluoroalkylethers, for instance those of formula $R_{fc}CH_2(OC_2H_4)n_cOH$, wherein $R_{fc}$ is a fluoroalkyl $C_4–C_{30}$, and $n_c$ is an integer from 1 to 12 (as described in EP patent application EP-51,526); compounds formed by a perfluoropolyoxyalkylenic chain bound to a polyoxyalkylenic chain.

The microemulsions can also contain other polar organic compounds acting as co-solvents or co-surfactants, such as alcohols $C_1–C_{10}$, ketones $C_2–C_{10}$, esters $C_2–C_{10}$, both fluoro-containing and fluorine-free, branched and non branched. To avoid destabilization problems of the microemulsion, such compounds are preferably added in amount lower than 10% by weight with respect to the total of the microemulsion components.

Salts soluble in water can also be added, in order to increase the ionic strength of the aqueous phase.

For the use in (co)polymerization reactions of fluoro-containing monomers a defined above, it is preferable that the amount of fluoropolyoxyalkylene is at least equal to 50% by volume of the total oil phase ((per) fluoropolyethers with end groups H and not, and hydrogen-containing part comprising solvents and peroxides), preferably from 50 to 95% by volume.

The preparation of the microemulsions is well known in the art above mentioned which is incorporated herein by reference. It is performed by simply mixing the components, without the need to supply the system with a remarkable dispersion energy, as it occurs, on the contrary, in the case of conventional emulsions. Moreover the emulsions, known also as macroemulsions, once separated are no longer reutilizable, while on the contrary the microemulsions are restorable through a low energy. For this reason it is well known that microemulsions are defined as indefinitely stable.

The amount of radicalic initiator, component c) of the invention, in the microemulsion, is the usual one for the (co)polymerization of fluoro-containing olefinic monomers, and it is generally comprised between 0.003% and 5% by weight, preferably 0.05–2%, with respect to the total amount of (co)polymerized monomers.

Moreover, as known, the technique in emulsion needs also the presence of surfactants to stabilize the polymer particles in the latex. Since the surfactants used in the microemulsion are of the same kind as those usually used in this kind of (co)polymerizations, it is not necessary in general to add other surfactants, the amount present in the microemulsion being already sufficient to the purpose. If this does not occur, it is always possible to add other fluoro-containing surfactants of the same kind described above. Among those more commonly used we remember: ammonium perfluorooctanoate, (per)fluoropolyoxyalkylenes as defined above terminated with one or more carboxylic groups, etc.

The polymerization temperature can vary within a wide range, generally from 10° to 150° C., preferably from 50° to 120° C., while the pressure is generally comprised from 10 to 100 bar, preferably from 15 to 60 bar.

The process object of the present invention can be employed with all kinds of fluoro-containing olefinic monomers, optionally containing hydrogen and/or chlorine and/or bromine and/or iodine and/or oxygen, and at least a monomer comprising at least a double bond and containing H, perfluorinated or fluoro containing or fluorine-free, monomer, provided that they are able to give (co)polymers containing hydrogen by reaction with radical initiators in aqueous emulsion. Among the monomers we can mention: perfluoroolefins $C_2–C_8$, branched when possible or non branched, such as tetrafluoroethylene (TFE), hexafluoropropene (HFP), hexafluoroisobutene; hydrogen-containing fluoroolefins $C_2–C_8$, branched when possible or non branched, such as vinylfluoride (VF), vinylidene fluoride (VDF), trifluoroethylene, perfluoroalkylethylene $CH_2$=CH—$R_{f0}$, wherein $R_{f0}$ is a perfluoroalkyl $C_1–C_6$ branched when possible or non branched; chloro- and/or bromo- and/or iodo-fluoroolefins $C_2–C_8$ branched when possible or non branched, such as chlorotrifluoroethylene (CTFE) and bromotrifluoroethylene; perfluorovinylethers $CF_2$=CFOX$_0$, where $X_0$ is a perfluoroalkyl $C_1–C_6$, branched when possible or non branched, for instance trifluoromethyl, pentafluoroethyl or heptafluoropropyl or a perfluoro-oxyalkyl $C_1–C_9$ branched when possible or non branched, having one or more ether groups, for instance perfluoro-2-propoxy-propyl; perfluorodioxols.

Fluoro-containing olefinic monomers can also be copolymerized with fluorine-free olefins $C_2–C_3$, branched when possible or non branched, such as ethylene, propylene, isobutylene.

Among the fluoro-containing polymers containing hydrogen, wherein at least a comonomer contains H, to which the process object of the present invention applies, are in particular comprised:

TFE modified polymers, containing amounts, generally comprised between 0.1 and 10% by moles, of one or more comonomers such as, for instance: perfluoropropene, perfluoroalkylvinylethers, chlorotrifluoroethylene and an hydrogen-containing comonomer, for instance vinylidene fluoride, hexafluoroisobutene and perfluoroalkyl-ethylene;

TFE or CTFE copolymers with ethylene, propylene or iso-butylene, optionally containing a third fluoro-containing comonomer, for instance a perfluoroalkylvinylether, in amounts comprised between 0.1 and 10% by moles (see for instance U.S. Pat. Nos. 3,624,250 and 4,513,129);

TFE elastomeric copolymers with a perfluoroalkylvinylether or a perfluorooxyalkylvinylether, containing propylene or ethylene, besides lower amounts of a "cure-site" monomer (see for instance U.S. Pat. Nos. 3,467,635 and 4,694,045);

polymers having dielectric characteristics, comprising 60–79% by moles of VDF, 18–22% by moles of trifluoroethylene and 3–22% by moles of CTFE (see U.S. Pat. No. 5,087,679);

VDF elastomeric polymers, such as VDF/HFP copolymers and VDF/HFP/TFE terpolymers (see, for instance, GB patent 888.765 and Kirk-Othmer, "Encyclopedia of Chemical Technology", Vol. 8, pag. 500–515-1979); such polymers can also contain: hydrogen-containing olefins, such as ethylene and propylene (as described for instance in EP-518,073); perfluoroalkylvinylethers; bromo- and/or iodo-containing "cure-site" comonomers; terminal iodine atoms, for instance according to U.S. Pat. No. 4,243,770, U.S. Pat. No. 4,973,633 and EP-407,937;

polyvinylidene fluoride or modified polyvinylidene fluoride with amounts generally comprised between 0.1 and 10% by moles, of one or more fluoro-containing comonomers, such as vinylfluoride, chlorotrifluoroethylene, hexafluoropropene, tetrafluoroethylene, trifluoroethylene, etc. (see for instance U.S. Pat. Nos. 4,524,194 and 4,739,024).

In order to check the molecular weight of the polymer, suitable chain transfer agents can be added to the reaction system, such as: ketones, esters, ethers or aliphatic alchols having from 3 to 10 carbon atoms, linear or branched; hydrocarbons or halogenated hydrocarbons, having from 1 to 6 carbon atoms, linear or branched when possible; bis (alkyl)carbonates wherein alkyl has from 1 to 5 carbon atoms, linear or branched when possible; etc. Among them, chloroform and methylcyclopentane are particularly preferred. The use of methylcyclopentane, and more generally of cyclopentanes alkylsubstituted with one or more alkyls $C_1$-$C_6$, as chain transfer agents in polymerization processes of fluoro-containing monomers containing hydrogen, is described in the Applicant's patent application EP 673,952. The transfer agent is sent to the reactor at the beginning of the reaction, or in continuous or in discrete amounts during the polymerization. The amount of the chain transfer agent used may vary within a rather wide range, depending on the kind of monomers used, on the reaction temperature and on the molecular weight intended to be obtained. Generally, such an amount ranges from 0.01 to 30% by weight, preferably from 0.05 to 10% by weight, with respect to the total amount of monomers introduced into the reactor.

The mechanical properties and the chemical resistance of the polymers obtained are reported in the examples and determined according to the methods indicated herein.

Some working examples are hereinunder reported, whose aim is merely illustrative but not limitative of the scope of the present invention.

EXAMPLE 1

EXAMPLE 1A

Preparation of the Fluoropolyoxyalkylene Microemulsion having Hydrogen-Containing End Groups and Diterbutylperoxide (DTBP).

In a glass flask, equipped with a stirrer, were mixed under mild stirring 15.96 g of demineralized $H_2O$, 14.44 g of a surfactant of the formula:

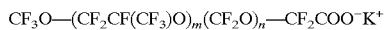

having a m/n ratio=26.2 and an average molecular weight of about 580, and 7.6 g of a solution formed by diterbutylperoxide and by a fluoropolyoxyalkylene containing hydrogen atoms in terminal position, having the formula:

having average molecular weight=400

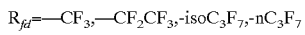

hydrogen ppm (H)=150.

The volume ratio between fluoropolyoxyalkylene and diterbutylperoxide is 3:1. At temperature comprised between 30° and 55° C., the system spontaneously forms a microemulsion, which appears as a limpid, thermodynamically stable solution.

EXAMPLE 1B

Example 1A was repeated, except that the volume ratio between fluoropolyoxyalkylene and DTBP is 2:1. At a temperature higher than 50° C., the system spontaneously forms a microemulsion, which appears as a limpid, thermodynamically stable solution.

EXAMPLE 1C

Example 1B was repeated, except that the oil phase is consitututed by fluoropolyoxyalkylene and by a mixture of isooctane and DTBP in 1:1 volume ratio. At a temperature higher than 50° C., the system spontaneously forms a microemulsion, which appears as a limpid, thermodynamically stable solution.

EXAMPLE 1D

Homopolymerization of VDF

A 5 l AISI 316 steel chromium-placed autoclave, equipped with a stirrer working at 570 rpm, was evacuated and 3.8 l of demineralized $H_2O$, 38 g of the microemulsion previously prepared, equal to 14.44 g or surfactant and 2 ml of chloroform as chain transfer agent were introduced therein in sequence.

The autoclave was then brought to the temperature of 115° C. and loaded with VDF until the working pressure of 50 absolute bar was reached. 15.8 ml of diterbutylperoxide were then introduced. The working pressure was maintained constant during the reaction by feeding VDF.

After 303 minutes the reaction was stopped by cooling at room temperature. The obtained latex (166.5 g of polymer/l of latex) was then discharged, coagulated by mechanical stirring, washed with $H_2O$ and dried at 105° C. The temperature of second melting (166.4° C.) was determined by differential scanning calorimetry (DSC). The Melt Flow Index (MFT), (3.3 g/10') was measured at 232° C. with a load of 5 kg according to ASTM D-3222-88 standard. The mechanical properties were determined at 23° C. according to ASTM D-1708 standard (see Table 1) and the chemical resistance is reported in Table 2.

The average reaction rate (Rp) is equal to 0.66 g polymer/l $H_2O$ min.).

EXAMPLE 2

COMPARATIVE (PVDF)

EXAMPLE 2A
Preparation of the Perfluoropolyoxyalkylene Microemulsion Having Hydrogen-Containing End Groups In a glass flask, equipped with a stirrer, were mixed under mild stirring 15.96 g of demineralized $H_2O$, 14.44 g of the surfactant of the formula:

$$CF_3O-(CF_2-CF(CF_3)O)_m(CF_2O)_n-CF_2COO^-K^+$$

having a m/n ratio=26.2 and an average molecular weight of about 580, and 7.6 g of a fluoropolyoxyalkylene containing hydrogen atoms in terminal position, having the formula:

$R_{fd}-(OCF(CF3)CF2)-R'_d$ having average molecular weight=400

$R_{fd}=-CF_3,-CF_2CF_3,-isoC_3F_7,-$ n $C_3F_7$ $R'_d=-OCFH-CF_3,-OCF_2H$ (in 50:1 molar ratio) and $R_{fd}$ hydrogen ppm (H)=150.

At room temperature 20°–25° C., the system spontaneously forms a microemulsion, which appears as a limpid, thermodynamically stable solution.

EXAMPLE 2B
Homopolymerization of VDF

A 5 l AISI 316 steel chromium-plated autoclave, equipped with a stirrer working at 570 rpm, was evacuated and 3.8 l of demineralized $H_2O$, 38 g of the microemulsion previously prepared, equal to 14.44 g of surfactant and 2 ml of chloroform as chain transfer agent were introduced therein in sequence.

The autoclave was then brought to the temperature of 115° C. and loaded with VDF until the working pressure of 50 absolute bar was reached. 17 ml of diterbutylperoxide were then introduced. The working pressure was maintained constant during the reaction by feeding VDF.

After 324 minutes the reaction was stopped by cooling at room temperature. The obtained latex (160 g of polymer/l of latex) was then discharged, coagulated by mechanical stirring, washed with $H_2O$ and dried at 105° C. The temperature of second melting (167.5° C.) was determined by differential scanning calorimetry (DSC). The Melt Flow Index (MFI), (3.9 g/10') was measured at 232° C. with a load of 5 kg according to ASTM D-3222-88 standard. The mechanical properties were determined at 23° C. according to ASTM D-1708 standard (see Table 1) and the chemical resistance is reported in Table 2.

The average reaction rate (Rp) is equal to 0.56 g polymer/l $H_2O$ min.

TABLE 1

|  | EXAMPLE 1D | EXAMPLE 2B (comparative) |
|---|---|---|
| Rp (g pol/l $H_2O$. min) | 0.66 | 0.56 |
| MFI (g/10') | 3.3 | 3.9 |
| Elastic Modulus (MPa) | 1659 | 1648 |
| Yield strength (MPa) | 51 | 51 |
| Stress at break (MPa) | 29 | 26 |
| Elongation at break (%) | 150 | 76 |

TABLE 2

Chemical resistance according to ASTM D543-87 standard in glacial acetic acid at 70° C. - Sample weight variation

| Days | EXAMPLE 1D Weight var. (%) | EXAMPLE 2B - compar. Weight var. (%) |
|---|---|---|
| 3 | 7.52 | 7.77 |
| 6 | 7.70 | 7.99 |
| 7 | 7.79 | 8.05 |
| 8 | 7.78 | 8.07 |
| 9 | 7.80 | 8.12 |

What is claimed is:

1. An indefinitely stable microemulsion which appears as a limpid, thermodynamically stable solution, consisting of the following components:
   (a) water;
   (b) a fluoropolyoxyalkylene having hydrogen-containing end groups and/or hydrogen-containing repeating units;
   (c) a fluorine-free organic initiator for the polymerization of fluoro-containing monomers, selected from alkylperoxides and alkylperoxydicarbonates, soluble in component (b), said component c) is optionally dissolved in a $C_1$–$C_{20}$ hydrocarbon, of aliphatic, cycloaliphatic, aromatic or mixtures thereof, creating a mixture, optionally the hydrocarbon can contain halogen atoms, said mixture is soluble in component (b); and
   (d) a fluoro-containing surfactant; wherein the amount of (b) is from 50 to 95% by volume of the total oil phase ((per) fluoropolyethers with end groups H and not, and hydrogen containing part comprising solvents and initiator).

2. The microemulsion of claim 1, wherein the fluoropolyoxyalkylenes having hydrogen-containing end groups and/or hydrogen-containing repeating units of component b) are constituted by repeating units, randomly distributed along the chain, selected from:
—CFZO—, —$CF_2$CFZO—,

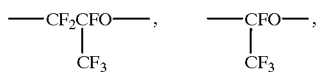

—$CZ_2CF_2CF_2O$—,

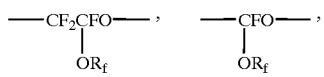

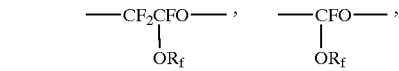

where Z is H or F, $R_f$ is $CF_3$, $C_2F_5$, or $C_3F_7$; and by hydrogen-containing end groups selected from —$CF_2H$, —$CF_2CF_2H$, —CFH—$CF_3$, and —CFH—$OR_f$, wherein $R_f$ is defined as above, or perfluorinated end groups selected from —$CF_3$, —$C_2F_5$ and —$C_3F_7$, at least one of the end groups containing hydrogen, the perfluorinated end group can also contain a chlorine atom, for instance of the type $CF_2CL$, $CF_3$—CFCL—$CF_2$,

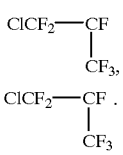

3. The microemulsion of claim 1, wherein the average molecular weight of component b) is comprised between 200 and 4000, and the hydrogen content of component b) is greater than 10 ppm.

4. The microemulsion of claim 1, wherein component b) is a mixture of perflourpolyethers (PFPE) containing hydrogen (H) in the end group and/or in the hydrogen repeating units, with PFPE not containing H, containing (per) fluorinated end groups, and optional containing chlorine atoms.

5. The microemulsion of claim 1, wherein fluoropolyoxyalkylenes containing hydrogen are selected from the groups consisting of:

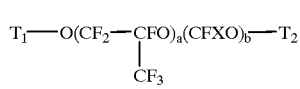
(a)

wherein:
$T_1$ and $T_2$, equal to or different from each other, are hydrogen-containing groups —$CF_2H$, —$CFH$—$CF_3$, or perfluorinated groups —$CF_3$, —$C_2F_5$, —$C_3F_7$, wherein at least one of the end groups contains hydrogen; X is —F or —$CF_3$; a, b, are integers such that the molecular weight is comprised in the above range, a/b are integers such that the molecular weight is comprised in the above range, a/b is comprised between 5 and 15;

(b) $T_3$—$O(CF_2$—$CF_2O)_c(CF_2O)_d$—$T_4$ wherein: $T_3$ and $T_4$, equal or different from each other, are hydrogen-containing groups —$CF_2H$ or —$CF_2$—$CF_2H$, or perfluorinated groups —$CF_3$, —$C_2F_5$; wherein at least one of the end groups contains hydrogen; c, d being integers such that the molecular weight is comprised in the above range, c/d is comprised between 0.3 and 5;

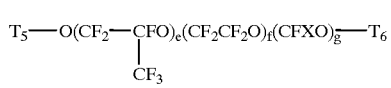
(c)

wherein:
$T_5$ and $T_6$, equal to or different from each other, are hydrogen-containing groups —$CF_2H$, —$CF_2CF_2H$, or —$CFH$—$CF_3$, or perfluorinated groups —$CF_3$, —$C_2F_5$, —$C_3F_7$, wherein at least one of the end groups contains hydrogen; X is —F or —$CF_3$; and e, f, g are integers such that the molecular weight is comprised in the above range, e/(f+g) being comprised between 1 and 10, f/g being comprised between 1 and 10;

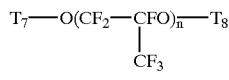
(d)

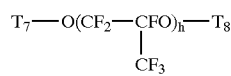
(d)

wherein:
$T_7$ and $T_8$ are hydrogen-containing groups —$CFH$—$CF_3$, or perfluorinated groups —$C_2F_5$, —$C_3F_7$, wherein at least one of the end groups contains hydrogen; h being an integer such that the molecular weight is comprised in the above range;

(e) $T_9$—$O(CZ_2CF_2CF_2O)_i$—$T_{10}$
wherein:
$Z_2$ is F or H; $T_9$ and $T_{10}$, equal to or different from each other, are groups —$CF_2H$, —$CF_2CF_2H$, or perfluorinated groups —$CF_2$, —$C_2F_5$, —$C_3F_7$, wherein at least one of the end groups contains hydrogen; i being an integer such that the molecular weight is comprised in the above range;

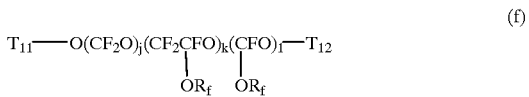
(f)

wherein
$R_f$ is —$CF_3$, —$C_2F_5$, or —$C_3F_7$; $T_{11}$ and $T_{12}$, equal to or different from each other, are groups —$CF_2H$, —$CF_2CF_2H$, —$CFH$—$OR_f$, or perfluorinated groups —$CF_3$, —$C_2F_5$, —$C_3F_7$, wherein at least one of the end groups contains hydrogen; j, k, l being integers such that the molecular weight is comprised in the range indicated above, k+l and j+k+l are at least equal to 2, k/(j+l) is comprised between $10^{-2}$ and $10^3$, l/j is comprised between $10^{-2}$ and $10^2$;

(g)

wherein:
$T_{13}$ and $T_{14}$, equal to or different from each other, are hydrogen-containing groups —$CF_2H$, —$CFH$—$CF_3$, or perfluorinated groups —$CF_3$, —$C_2F_5$, —$C_3F_7$, wherein at least one of the end groups contains hydrogen; X is —F or —$CF_3$; m, n, o p being integers such that the molecular weight is comprised in the range indicated above, m/n is comprised between 5 and 40, m/(o+p) is comprised between 2 and 50, o+p is at least 3, o is lower than p;

(h) $T_{15}$—$O(CF_2CF_2O)_q(CF_2O)_r(CFHO)_s(CF_2CFHO)_t$—$T_{16}$ wherein:
$T_{15}$ and $T_{16}$, equal to or different from each other, are hydrogen-containing groups —$CF_2H$, —$CF_2CF_2H$, or perfluorinated groups —$CF_3$, —$C_2F_5$, wherein at least one of the end groups contains hydrogen; q, r, s, t are integers such that the molecular weight is comprised in the range indicated above, q/r is comprised between 0.5 and 2, (q+r)/(s+t) is comprised between 3 and 40, s+t is at least 3, s is lower than t;

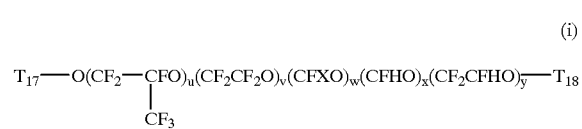
(i)

wherein:
$T_{17}$ and $T_{18}$, equal to or different from each other, are hydrogen-containing groups —$CF_2H$, —$CF_2CF_2H$, CHF—$CF_3$ or perfluorinated groups —$CF_3$, —$C_2F_5$, wherein at —$C_3F_7$, wherein at least one of the end groups contains hydrogen; X is —F or —$CF_3$; u, v, w, x, y are integers such that the molecular weight is comprised in the range indicated above, (u+v)/w is comprised between 5 and 40, (u+v)/(x+y) is comprised between 2 and 50, x+y is at least 3, x is lower than y.

6. The microemulsion of claim 1, wherein component d) is of both an ionic and non-ionic sufactant.

7. The microemulsion of claim 6, wherein the fluorocontaining surfactant is selected from the anionic ones of formula:

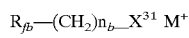

wherein $n_b$ is an integer from 0 to 6; $R_{fb}$ is a (per)fluoroalkylic chain $C_5$–$C_{16}$ or a (per)fluoropolyoxyalkylenic chain as defined above, $X^-$ is —COO$^-$ or —SO$_3^-$, $M^+$ is selected from: $H^+$, $NH_4^+$, alkali metal ion, the $R_{fb}$ chain can contain one or more anionic groups described above and the end group $R_{fb}$ can contain chlorine atoms.

8. The microemulsion of claim 1, wherein the amount of radical initiator component c) in the microemulsion is comprised between 0.003% and 5% by weight with respect to the total amount of (co)polymerized monomers.

* * * * *